United States Patent [19]

Steltzer

[11] Patent Number: 5,105,322

[45] Date of Patent: Apr. 14, 1992

[54] TRANSVERSE POSITIONER FOR READ/WRITE HEAD

[75] Inventor: Edward L. Steltzer, Westborough, Mass.

[73] Assignee: Digital Equipment Corporation, Maynard, Mass.

[21] Appl. No.: 545,926

[22] Filed: Jun. 29, 1990

[51] Int. Cl.$^5$ .......................... G11B 5/55; G11B 21/08
[52] U.S. Cl. .................................................. 360/106
[58] Field of Search ........................................ 360/106

[56] References Cited

U.S. PATENT DOCUMENTS

| | | | |
|---|---|---|---|
| 4,005,493 | 1/1977 | Morgan | 360/106 |
| 4,071,866 | 1/1978 | Butsch | 360/106 |
| 4,414,593 | 11/1983 | Miller et al. | 360/102 |
| 4,747,004 | 5/1988 | Kukreja et al. | 360/106 |
| 4,918,548 | 4/1990 | O'Donnell et al. | 360/92 |

*Primary Examiner*—Robert S. Tupper
*Attorney, Agent, or Firm*—Fish & Richardson

[57] ABSTRACT

The invention features an apparatus for positioning a magnetic tape head transversely relative to a length of magnetic tape in a tape drive and includes a threaded leadscrew driven by a motor, a movable carriage for holding the tape head and having separated guide holes for receiving the threaded leadscrew and guiding the movable carriage axially along the leadscrew so that the resulting tape head motion is transverse to the direction of the tape. A leadscrew nut is connected to the movable carriage so that a threaded portion of the nut engages the leadscrew threads between the separated guide holes to propel the carriage axially along the leadscrew when the motor rotates the leadscrew. A spring is attached to the carriage and bears on the leadscrew nut so that the leadscrew nut threads are preloaded against the leadscrew threads. The guide holes include a pair of flattened surfaces forming a V-shaped groove parallel to the leadscrew and opposite the leadscrew nut so that the leadscrew nut bearing against the leadscrew preloads the leadscrew into the V-shaped groove of the guide holes.

20 Claims, 6 Drawing Sheets

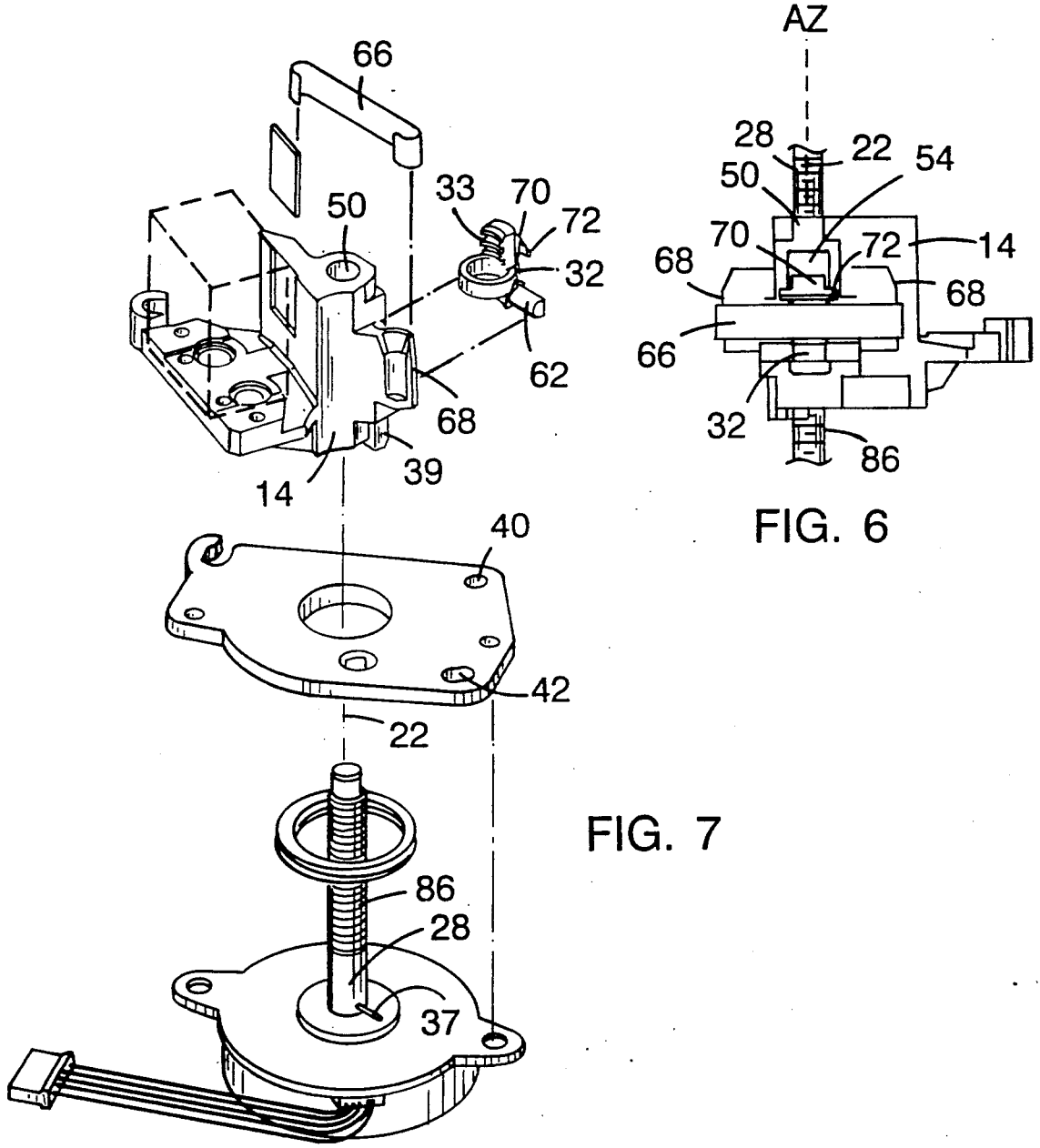

1

TRANSVERSE POSITIONER FOR READ/WRITE HEAD

BACKGROUND OF THE INVENTION

This invention relates generally to magnetic tape drives, and more particularly to a mechanism for transversely positioning a magnetic tape head relative to the direction of travel of the magnetic tape.

Magnetic tape drives are used extensively as memory backup devices for small and mid-size computer systems. A streaming tape drive stores data in parallel longitudinal tracks on a length of magnetic tape typically ¼" or ½" wide. High speed and recording density are achieved by writing or reading each track as a single stream of data without interruption, thus eliminating inefficiencies due to starting and stopping the tape. At the end of a track the magnetic tape head is moved transversely across the tape to access an adjacent parallel track before the tape direction is reversed and the adjacent track is accessed.

The precision with which the tape head can be positioned across the tape determines the density of the parallel tracks on the tape. The magnetic head must be capable of moving transversely across the tape in increments at least as small as the width of a track, and be accurately maintained at each position. Similarly, the tape head must be repeatably positionable at each track to recover the data on that track. Typically, a leadscrew driven by a stepper motor moves the tape head which is coupled to the threads of the leadscrew so that the head moves a predetermined distance across the tape for each rotation of the leadscrew. Uncontrolled motion of the head relative to the tape produces positioning errors which result in data errors in reading or writing a track. Reducing uncontrolled motion is critical, especially where the tracks are densely packed.

SUMMARY OF THE INVENTION

In general, in one aspect, the invention features an apparatus for positioning a magnetic tape head transversely relative to a length of magnetic tape in a tape drive and includes a threaded leadscrew driven by a motor, a movable carriage for holding the tape head and having at least two separated guide holes for receiving the threaded leadscrew and guiding the movable carriage axially along the leadscrew so that the resulting tape head motion is transverse to the direction of the tape. A leadscrew nut is connected to the movable carriage so that a threaded portion of the nut engages the leadscrew threads between the separated guide holes to propel the carriage axially along the leadscrew when the motor rotates the leadscrew. Preferably, the carriage and the leadscrew nut are of molded polymer which includes a solid lubricant such as PTFE.

In another aspect, a spring is attached to the movable carriage and bears on the leadscrew nut so that the leadscrew nut threads are preloaded against the leadscrew threads. Preferably, the leadscrew nut includes a crossbar adjacent to the spring so that the spring acts on the nut between the threaded portion of the nut and the crossbar. The crossbar has a curved surface adjacent to the carriage and the carriage has a V-shaped groove substantially perpendicular to the leadscrew for pivotally mounting the curved surface of the crossbar. The spring also urges the curved surface against the V-shaped groove. Preferably, the spring is a resilient band attached between opposing flanges extending from the carriage on either side of the nut so that the band extends across and contacts the nut between the threaded portion and the crossbar.

In another aspect, each guide hole includes a pair of flattened surfaces forming a V-shaped groove parallel to the leadscrew and opposite the leadscrew nut so that the leadscrew nut bearing against the leadscrew preloads the leadscrew into the V-shaped groove of the guide holes.

In yet another aspect, a motor mounting plate is attached to the frame for holding the motor. A coil spring is positioned between the motor and the mounting plate to urge the motor away from the mounting plate. One end of the leadscrew is connected to the motor and the other end is mounted in a bearing in the frame. The leadscrew passes through the motor mounting plate so that the coil spring bears against the motor to cause an axial force along the leadscrew to preload the leadscrew against the bearing. Preferably, the motor mounting plate includes at least two slotted mounting holes having slots perpendicular to each other for adjusting the vertical axis of the leadscrew.

In another aspect, a pin extends substantially perpendicularly from the leadscrew and a stop extends from the carriage above or below the carriage so that the pin contacts the stop to prevent further rotation of the leadscrew when the carriage is moved to its uppermost or lowermost position along the leadscrew, respectively.

The tape head positioning mechanism of the present invention significantly increases the density of parallel recording tracks across a length of magnetic tape while maintaining a low parts count and manufacturing cost. Vertical backlash and vertical motion hysteresis are virtually eliminated. Stable tape head azimuth and zenith mounting angles are factory adjustable and precisely maintained to within 5 minutes of angular error for significantly reducing tape head positioning errors. Head positioning transverse to the tape is repeatable to within 0.5 mils, which allows 48 high density recording tracks to be laid down on a standard ¼" width magnetic tape.

DESCRIPTION OF THE PREFERRED EMBODIMENT

The preferred embodiment described below is incorporated in a model TF-85 high density streaming magnetic tape drive manufactured by Digital Equipment Corporation, Maynard, Mass. Other embodiments may also take advantage of the features of the invention to precisely control the vertical movement of a device by a leadscrew.

The drawings are briefly described as follows.

Figure 3:
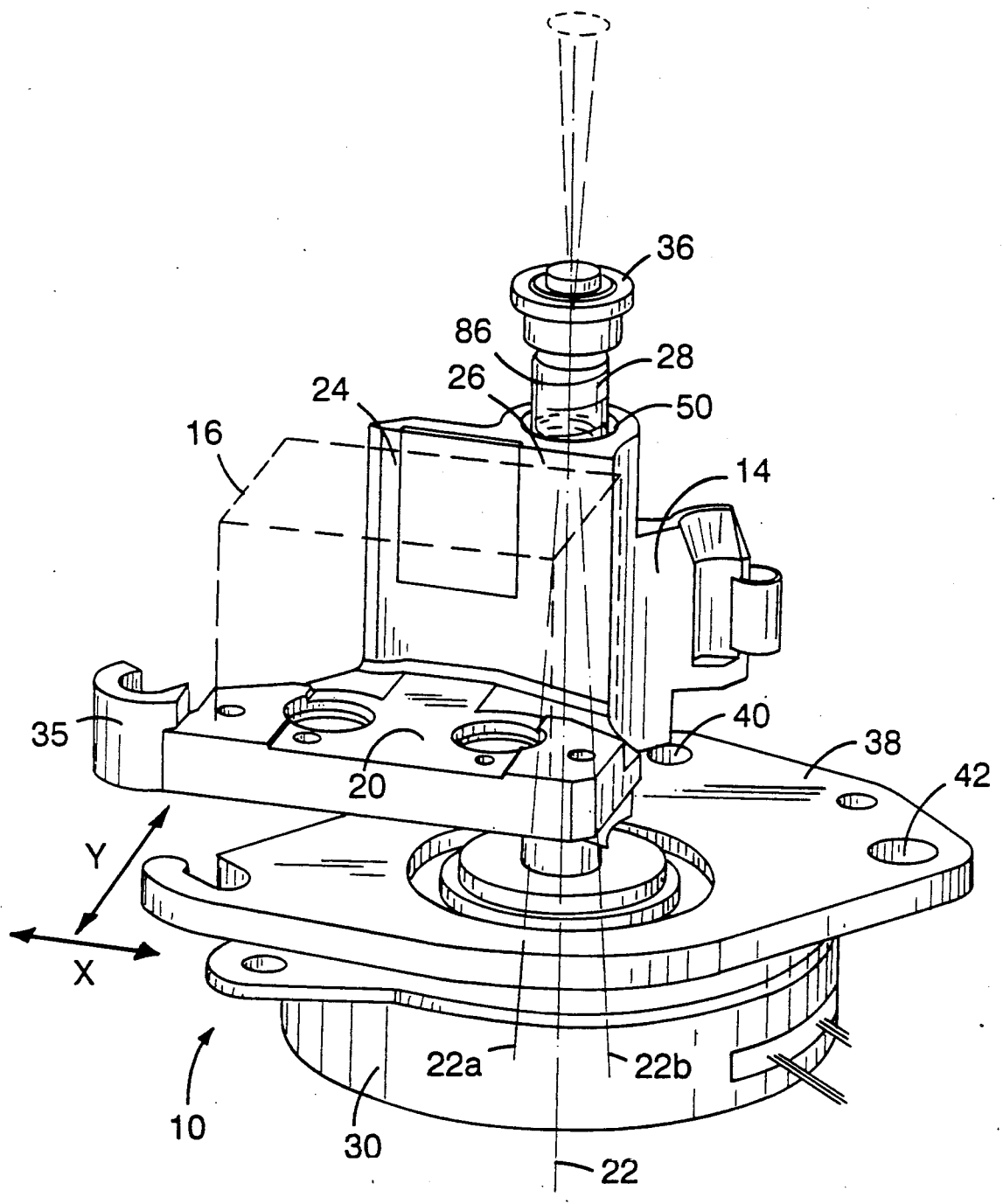
FIG. 3 is a perspective view of the head lift assembly of FIG. 1.
Figure 4A:
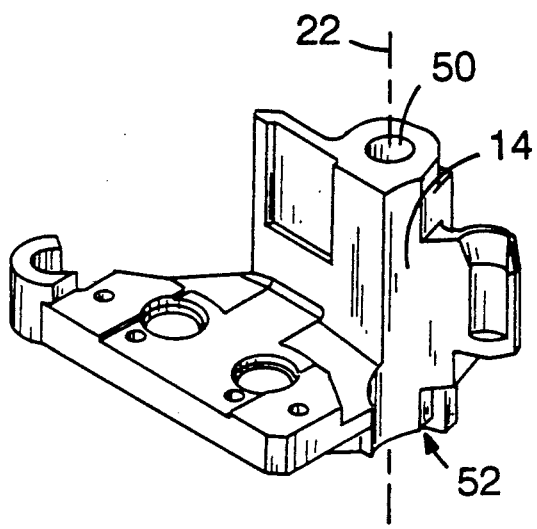
FIGS. 4a and 4b are perspective views of the tape head carriage of the head lift assembly of FIG. 3 rotated 180° about the vertical axis.
Figure 4B:
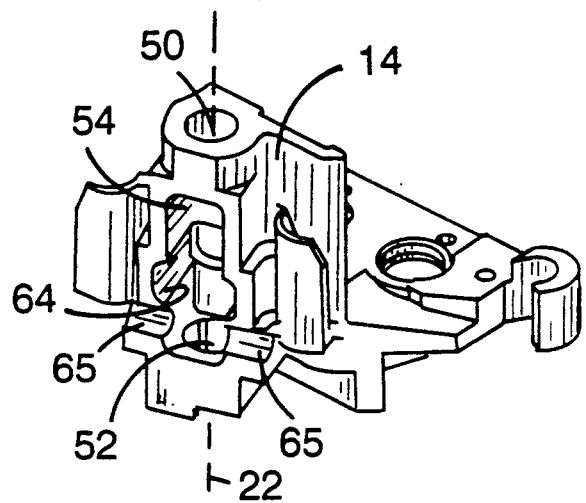
Figure 5A:
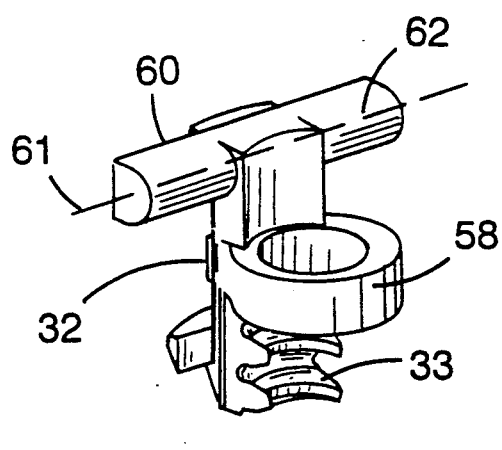
Figure 5B:
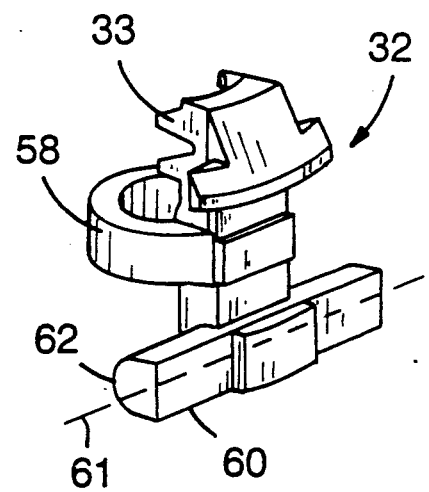
Figure 8:
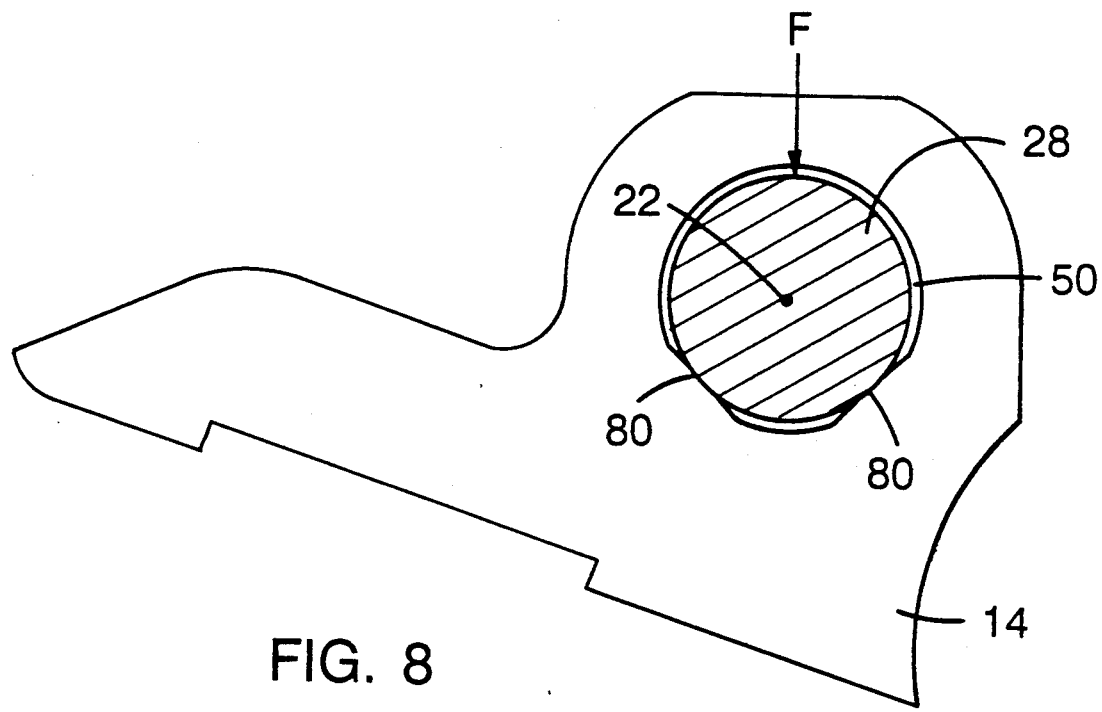
Figure 9:
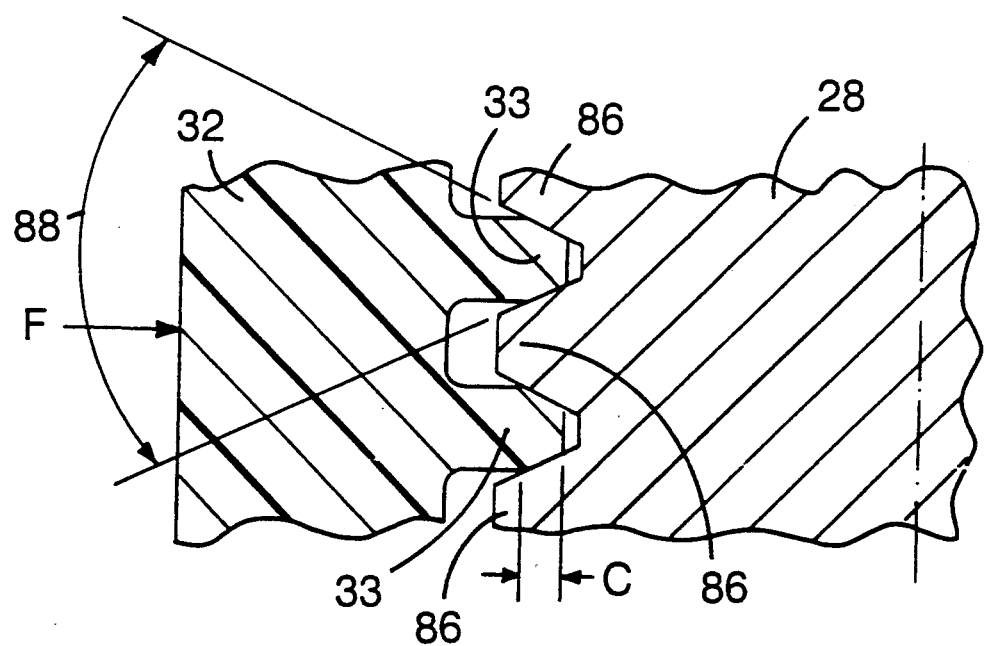

FIGS. 5a and 5b are perspective views of the leadscrew nut which attaches to the tape head carriage of FIGS. 4a and 4b. rotated 180° about the horizontal axis;

FIG. 6 is a back view in elevation of the tape head carriage of the head lift assembly of FIG. 3;

FIG. 7 is an axially exploded assembly view in perspective of the head lift assembly of FIG. 3;

FIG. 8 is a top view of the tape head carriage of the head lift assembly of FIG. 3 with the leadscrew in section; and FIG. 9 is a longitudinal cross-sectional view of the leadscrew engaging the leadscrew nut threads of the head lift assembly of FIG. 3.

STRUCTURE

Figure 1:
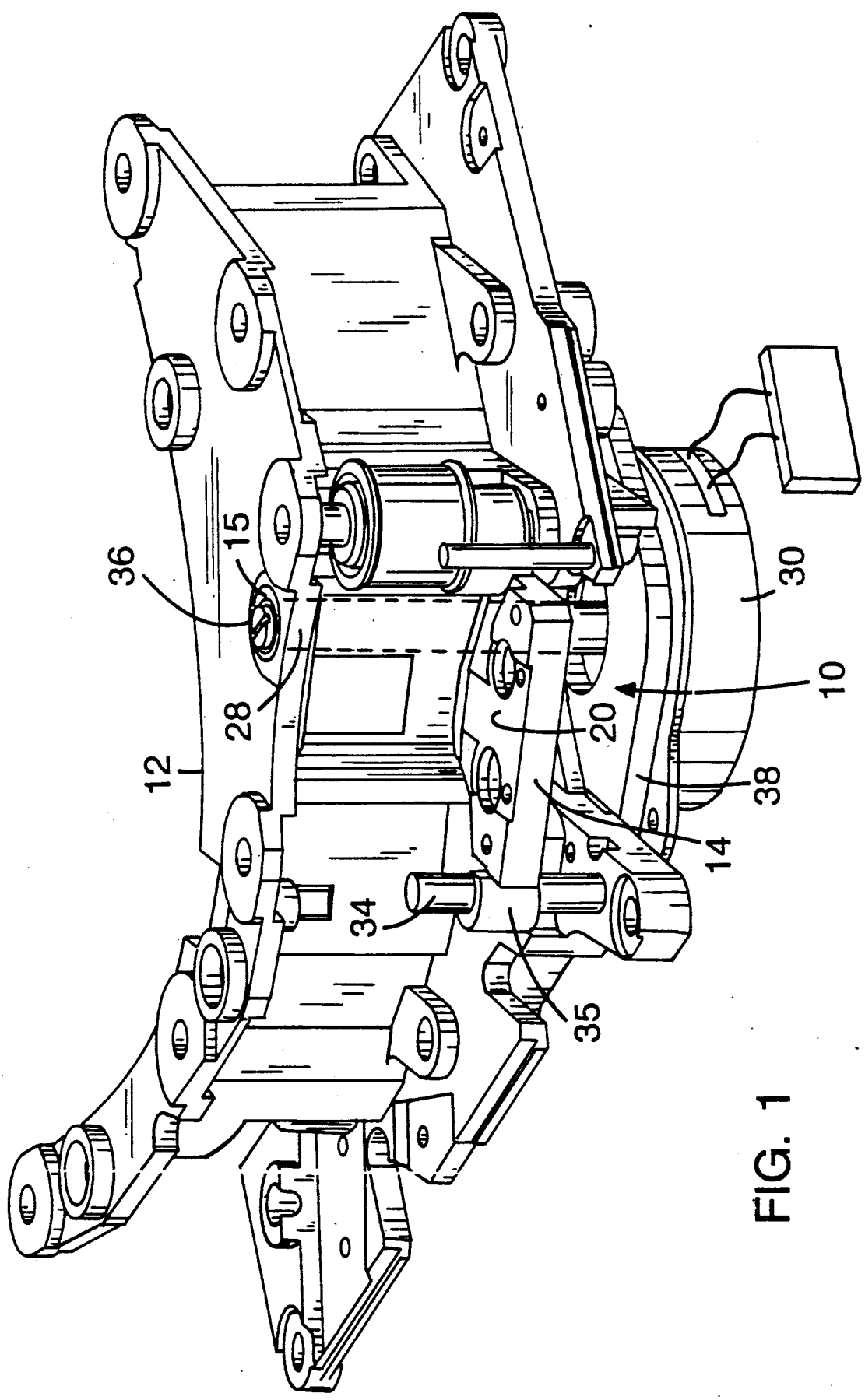
FIG. 1 is a perspective view of a magnetic head lift assembly according to the invention mounted in a tape transport frame.
Figure 2:
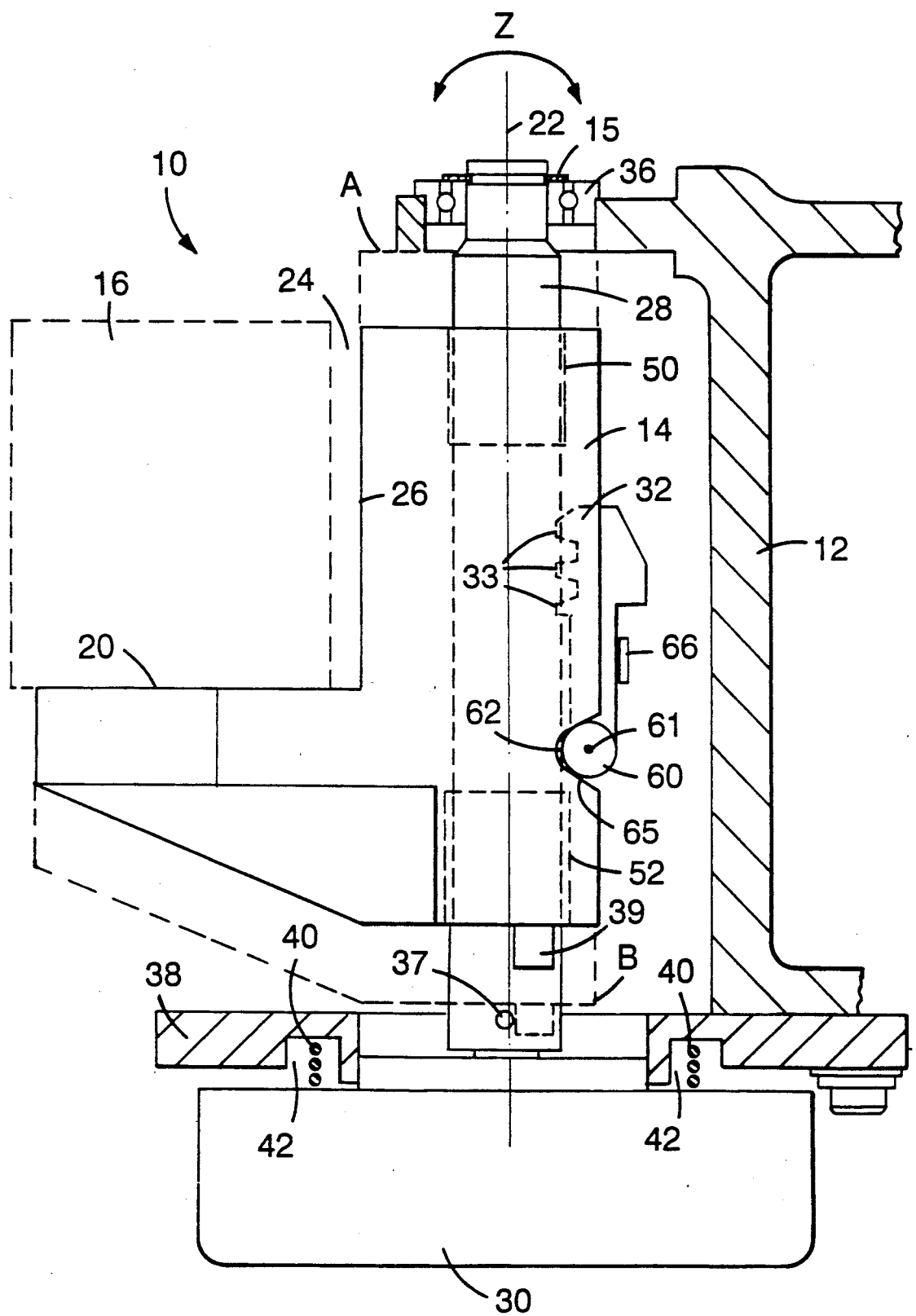
FIG. 2 is a cross-sectional view of the head lift assembly of FIG. 1 in an intermediate position, the excursion limits being shown in phantom.

Referring to FIGS. 1 and 2, a head lift assembly 10 for moving a tape head transversely across a magnetic tape in a magnetic tape drive is mounted in a tape transport frame 12 supporting a movable tape head carriage 14 made from molded polymer and having a carriage seat 20 for mounting a tape head 16 (FIG. 2). A tape path 24 is formed between tape head 16 and a surface 26 of the tape head carriage so that a magnetic tape (not shown) may be routed adjacent to the tape head. Tape head carriage 14 is translated along vertical axis 22, transverse to the direction of movement of the tape, by an externally-threaded leadscrew 28 driven by a stepper motor 30. Leadscrew 28 passes through upper and lower guide holes 50, 52 (FIG. 2) respectively, in carriage 14 which act to guide the carriage along the leadscrew. A molded polymer leadscrew nut or traveller 32 (FIG. 2) is connected to tape head carriage 14 between the upper and lower guide holes and has a threaded portion 33 which engages the threads 86 (FIG. 6) of leadscrew 28 so that when the leadscrew rotates, the tape head carriage travels up or down along vertical axis 22. The molded polymer tape head carriage and leadscrew nut include a solid lubricant such as PTFE to reduce friction. An auxiliary guide shaft 34 (FIG. 1) is slidably engaged by an auxiliary collar 35 extending on an arm from tape head carriage 14 to further locate, guide and support the carriage.

One end of leadscrew 28 is coaxially coupled to the drive shaft of a stepper motor 30, and the other end is mounted in a bearing 36 in the upper portion of frame 12, held in place by a washer 15. Stepper motor 30 is mounted on a motor mounting plate 38 rigidly connected to the lower portion of frame 12. A coil spring 40 (FIG. 2) is seated in an annular groove 42 in mounting plate 38 and is captured between the mounting plate and the stepper motor so that it bears against the stepper motor and pulls down on leadscrew 28 to preload bearing 36 in the axial direction toward the stepper motor. Preloading bearing 36 in this manner accurately maintains the lateral position of the leadscrew and prevents axial movement of the leadscrew along axis 22 when turning against a load.

The extent of travel of the carriage along vertical axis 22 is indicated in FIG. 2 by broken lines with position A indicating the uppermost extent and position B indicating the lowermost extent. The lowermost extent of travel is limited by a pin 37 (FIGS. 2 and 7), extending perpendicularly from leadscrew 28, which contacts a protrusion 39 on the tape head carriage which extends below the carriage to form a stop. When the carriage is lowered so the pin contacts the stop, the leadscrew is prevented from further rotation and stepper motor 30 stalls. This provides an accurate and repeatable lowermost position for the carriage and prevents the carriage from jamming against stepper motor mounting plate 38. The uppermost position A is determined by first positioning the carriage at lowermost position B and then counting the number of rotations of the leadscrew, thus limiting the vertical travel of the carriage.

Referring also to FIG. 3 (frame 12 not shown), slotted mounting holes 40, 42 in stepper motor mounting plate 38 allow the X and Y position of the mounting plate to be varied slightly with respect to frame 12. The position of the motor end of the leadscrew is variable by means of the slotted mounting holes while the bearing 36 end of the leadscrew remains stationary. Thus, the leadscrew vertical axis 22 may be slightly tilted (approximately 0.05°) to compensate for manufacturing tolerances, as for example axes 22a and 22b. Typically, this compensation is performed once in the factory to achieve the necessary alignment of tape head 16 to the magnetic tape path.

Referring to FIGS. 4a and 4b, tape head carriage 14 has upper and lower guide holes 50, 52 respectively, coaxially aligned with vertical axis 22. The upper and lower guide holes accept leadscrew 28 (FIG. 2) so that the leadscrew acts not only as a propulsion means, but also as a guide shaft for the tape head carriage. The upper and lower guide holes are separated by a hollow chamber 54 which accepts leadscrew nut 32 (FIGS. 5a and 5b). Referring also to FIGS. 5a and 5b, leadscrew nut 32 has a ring 58 adjacent to threaded portion 33, and a crossbar 60 having a curved surface 62 and a long axis 61.

Leadscrew nut 32 is adapted to extend into hollow chamber 54 of the tape head carriage so that the leadscrew, guided by guide holes 50, 52, passes through ring 58 and the leadscrew nut threaded portion 33 engages the adjacent threads of the leadscrew. A ring groove 64 (FIG. 4b) traverses the inside surface of chamber 54 to accept ring 58. Ring 58 prevents the threads of the leadscrew nut from disengaging the threads of the leadscrew during shock or vibration, but otherwise does not contact the leadscrew during normal operation. A V-shaped groove 65 (also see FIG. 2), cut in the tape head carriage adjacent to the hollow chamber and perpendicular to vertical axis 22, accepts curved surface 62 of crossbar 60 to vertically position the leadscrew nut relative to tape head carriage 14 and allows the nut to pivot about crossbar long axis 61 to engage the leadscrew.

Referring also to FIGS. 6 and 7, leadscrew nut 32 is preloaded against both the leadscrew 28 and tape head carriage 14 by leafspring 66, to virtually eliminate vertical motion backlash. Leafspring 66 is mounted between opposing flanges 68 extending from the head carriage on either side of hollow chamber 54 so that the leafspring traverses the hollow chamber. Leadscrew nut 32 has a ramped portion 70 which enables the leafspring to easily slide over the nut during assembly. Ramp 70 terminates in a lip 72 which prevents the leafspring from sliding out of place once assembly is complete.

When leadscrew nut 32 is in place within the hollow chamber, the leafspring bears against the back of the leadscrew nut with approximately 1 pound of force causing a positive contact between threaded portion 33 of the leadscrew nut and threads 86 of the leadscrew to eliminate play between the mated threads. The leafspring also causes a positive contact between the leadscrew nut crossbar curved surface 62 and the flattened surfaces of tape head carriage V-shaped groove 65 (FIG. 2) to precisely position the nut relative to the tape head carriage and prevent displacement of the nut when the leadscrew rotates relative to the nut.

Referring to FIG. 8, upper and lower guide holes 50, 52 (only upper guide hole 50 is shown) each have a pair of flattened surfaces 80 extending the length of the guide hole and positioned to act as a V-shaped groove for accepting the cylindrical surface of leadscrew 28. Preloaded leadscrew nut 32 (FIG. 2) bears against the leadscrew with a force F, causing the leadscrew to be pressed into flattened surfaces 80 which precisely position the leadscrew within guide holes 50, 52. Thus, the tape head carriage is precisely positioned relative to vertical axis 22 since the uncertainty inherent in aligning a cylindrical shaft within a slightly larger cylindrical hole has been removed.

Referring to FIG. 9, threads 33 of nut 32 are preloaded into the threads 86 of leadscrew 28 by preload force F. A thread form angle 88 of approximately 50° was chosen as a compromise between the moldability of the nut 32 and the holding performance of the threads.

OPERATION

In operation, leadscrew 28 (FIG. 2) is rotated by stepper motor 30 to move the tape head carriage 14 up or down less than one thousandth of an inch for each step of the motor. When the tape drive is powered up, a tape drive controller calibration routine causes the stepper motor to move the tape head carriage to the lowermost position B (FIG. 2), which is detected by the controller when the stepper motor stalls due to pin 37 on the leadscrew contacting stop 39 on the carriage. This provides a known, repeatable, and jam-proof starting point as a reference from which the carriage may be moved to any desired vertical position simply by pulsing the stepper motor appropriately. After this initial calibration, the controller commands the carriage movement in an open-loop fashion without need for further contact between the pin and the stop.

The preloading of leadscrew nut 32 against leadscrew threads 86 (FIG. 9) by leafspring force F virtually eliminates vertical position backlash (lost motion). Typically, backlash is caused by excess play between mating threads of a nut and leadscrew which causes the nut thread to contact only one side of the leadscrew thread. This leads to an ambiguous nut position on the leadscrew, especially when the leadscrew reverses direction. Referring again to FIG. 9, nut threads 33 only contact leadscrew threads 86 in the limited contact area C so that as the plastic nut loses material from normal wear, preloading and thread contact is maintained, and backlash remains zero.

Vertical motion hysteresis is virtually eliminated by using leadscrew 28 as both a propulsion means and a rotating guide shaft for the tape head carriage. Vertical hysteresis typically occurs when some vertical force developed by the rotating leadscrew is needed to overcome the static friction between the carriage guide holes and their respective guide shafts. This results in leadscrew rotation which causes elastic deformation between the nut and leadscrew threads (until static friction is overcome), rather than vertical movement of the carriage. By using the leadscrew as a guide shaft, static friction between guide holes 50, 52 (FIG. 2) and the leadscrew is broken by the rotation of the shaft, rather than by the vertical forces developed on the leadscrew nut to move the carriage. The relative velocity of the rotating leadscrew surface along the guide hole wall, which operates perpendicularly to the desired direction of vertical motion, is approximately 8 times the vertical velocity of the guide hole along the leadscrew. The vector sum of these two velocities is only about 1% greater than the rotational velocity of the leadscrew surface alone. Thus, the vast majority of force required to overcome the static friction is obtained from the rotating leadscrew, and therefore directly from the stepper motor, rather than indirectly through the leadscrew nut. Additionally, auxiliary guide shaft 34 (FIG. 1) is loosely coupled to auxiliary guide 35 so that there is little friction between the auxiliary guide shaft and the auxiliary guide.

Preloading the leadscrew against the V-shaped groove created by the flats 80 (FIG. 8 of guide holes 50, 52 greatly reduces the azimuth AZ (FIG. 6) and zenith Z (FIG. 2) tape head positioning errors associated with head carriage 14 tilting relative to the leadscrew vertical axis 22. An azimuth and zenith error tolerance of less than 5 minutes of arc is achieved. The relatively wide vertical separation of upper guide hole 50 from lower guide hole 52 increases the stability of the carriage relative to the leadscrew by providing guiding contact between the carriage and leadscrew from points spaced far apart on either side of the leadscrew nut.

The precise control over vertical movement of the tape head carriage coupled with enhanced stability of the carriage has achieved a four-fold increase in positioning accuracy leading to at least a doubling of recording density on a standard ¼" magnetic tape.

Other embodiments are within the following claims.

What is claimed is:

1. An apparatus for positioning a read/write head transversely relative to the direction of media travel in a storage media drive, comprising a supporting frame carrying a motor;

a threaded leadscrew mounted on said frame driven by said motor;

a movable head carriage carrying the head, said movable carriage having axially spaced first and second guide surfaces for receiving said threaded leadscrew and guiding said movable carriage axially along said leadscrew, the resulting head motion being transverse to the direction of the media, the axial spacing between said first and second guide surfaces being fixed;

a leadscrew nut having a threaded portion engaging only a portion of a first side of said threaded lead screw, said leadscrew nut connected to said movable carriage such that said threaded portion engages said leadscrew threads between said first and second guide surfaces to propel said movable carriage axially along said leadscrew when said motor rotates said leadscrew; and a spring attached to said movable carriage which simultaneously bears on said leadscrew nut such that said leadscrew nut threads are preloaded against said first side of said threaded leadscrew with a force perpendicular to the length of said threaded leadscrew, and draws said movable carriage towards said threaded leadscrew such that said first and second guide surfaces contact a second side of said threaded leadscrew that is opposite said first side, said spring tending to clamp said leadscrew between said first and second guide surfaces and said threaded portion of said leadscrew nut.

2. The apparatus of claim 1 wherein each said guide surface includes at least two substantially flat surfaces forming a V-shaped groove parallel to said leadscrew and opposite said leadscrew nut, said spring causing each said V-shaped groove to contact and bear on said second side of said leadscrew.

3. The apparatus of claim 1 further comprising
a motor mounting plate connected to said frame for holding said motor;
a spring positioned between said motor and said motor mounting plate for urging said motor away from said motor mounting plate; and
a bearing mounted in said frame opposite said motor mounting plate;
wherein one end of said leadscrew is connected to said motor and the other end of said leadscrew is held in said bearing, said leadscrew passing through said motor mounting plate so that said spring urges against said motor to cause an axial force along said leadscrew to preload said leadscrew against said bearing.

4. The apparatus of claim 3 wherein said motor mounting plate comprises at least two non-parallel slotted holes for mounting said motor mounting plate to said frame.

5. The apparatus of claim 1 further comprising
a guide shaft mounted on said frame substantially parallel to said leadscrew; and
a guide attached to said head carriage contacting said guide shaft and adapted to travel axially along said guide shaft.

6. The apparatus of claim 5 wherein said guide is a portion of a cylindrical sleeve.

7. The apparatus of claim 1 wherein said leadscrew nut is of molded polymer.

8. The apparatus of claim 7 wherein said threaded portion of said leadscrew nut has a thread angle between 30° and 70°.

9. The apparatus of claim 8 wherein said thread angle is between 45° and 55°.

10. The apparatus of claim 7 wherein said polymer comprises a solid lubricant.

11. The apparatus of claim 1 wherein said leadscrew nut further comprises a ring adjacent to said threaded portion, said leadscrew passing through said ring.

12. The apparatus of claim 1 wherein said head carriage is a molded polymer.

13. The apparatus of claim 12 wherein said polymer comprises a solid lubricant.

14. The apparatus of claim 1 wherein said leadscrew nut further comprises a pivot point contacting said movable carriage, said spring attached to said movable carriage bearing on said leadscrew nut such that said pivot point is forced against said movable carriage with a force perpendicular to the length of said threaded leadscrew.

15. An apparatus for positioning a read/write head transversely relative to the direction of media travel in a storage media drive, comprising
a supporting frame carrying a motor;
a threaded leadscrew mounted on said frame driven by said motor;
a movable head carriage carrying the head, said movable carriage having axially spaced first and second guide surfaces for receiving said threaded leadscrew and guiding said movable carriage axially along said leadscrew, the resulting head motion being transverse to the direction of the media;
a leadscrew nut having a threaded portion, said leadscrew nut connected to said movable carriage such that said threaded portion engages said leadscrew threads between said first and second guide surfaces to propel said movable carriage axially along said leadscrew when said motor rotates said leadscrew; and
a spring attached to said movable carriage and bearing on said leadscrew nut such that said leadscrew nut threads are preloaded against said leadscrew threads;
wherein said leadscrew nut further comprises an elongated crossbar adjacent said spring engaging said carriage such that said spring is between said threaded portion and said crossbar so as to resiliently clamp said leadscrew between the threaded portion and said carriage.

16. The apparatus of claim 15 wherein
said crossbar has a curved surface adjacent said head carriage;
said head carriage further comprises a V-shaped groove adapted to pivotally accept said crossbar curved surface, said V-shaped groove being substantially perpendicular to said axial direction of said leadscrew; and
said spring urges said curved surface against said V-shaped groove.

17. The apparatus of claim 16 wherein said V-shaped groove comprises at least two flattened surfaces at an angle between 40° and 60° relative to one another.

18. An apparatus for positioning a read/write head transversely relative to the direction of media travel in a storage media drive, comprising
a supporting frame carrying a motor;
a threaded leadscrew mounted on said frame driven by said motor;
a movable head carriage carrying the head, said movable carriage having axially spaced first and second guide surfaces for receiving said threaded leadscrew and guiding said movable carriage axially along said leadscrew, the resulting head motion being transverse to the direction of the media;
a leadscrew nut having a threaded portion, said leadscrew nut connected to said movable carriage such that said threaded portion engages said leadscrew threads between said first and second guide surfaces to propel said movable carriage axially along said leadscrew when said motor rotates said leadscrew; and
a spring attached to said movable carriage and bearing on said leadscrew nut such that said leadscrew nut threads are preloaded against said leadscrew threads;
wherein said head carriage comprises at least two opposing flanges extending from said head carriage on either side of said leadscrew nut; and
said spring comprises a resilient band attached to and between said flanges, said band contacting said leadscrew nut to cause said leadscrew nut to bear against said leadscrew.

19. An apparatus or positioning a read/write head transversely relative to the direction of media travel in a storage media drive, comprising
a supporting frame carrying a motor;
a threaded leadscrew mounted on said frame driven by said motor;
a movable head carriage carrying the head, said movable carriage having axially spaced first and second guide surfaces for receiving said threaded leadscrew and guiding said movable carriage axially along said leadscrew, the resulting head motion being transverse to the direction of the media; and a leadscrew nut having a threaded portion, said leadscrew nut connected to said movable carriage such that said threaded portion engages said leadscrew threads between said first and second guide surfaces to propel said movable carriage axially along said leadscrew when said motor rotates said leadscrew;

wherein said leadscrew further comprises a pin extending substantially perpendicular from said leadscrew; and said head carriage further comprises a protrusion extending below said carriage such that said pin contacts said protrusion to prevent further rotation of said leadscrew when said head carriage is moved to its lowermost position along said leadscrew.

20. An apparatus for positioning a read/write head transversely relative to the direction of media travel in a storage media drive, comprising a supporting frame carrying a motor;

a threaded leadscrew mounted on said frame driven by said motor;

a movable head carriage carrying the head, said movable carriage having axially spaced first and second guide surfaces for receiving said threaded leadscrew and guiding said movable carriage axially along said leadscrew, the resulting head motion being transverse to the direction of the media; and a leadscrew nut having a threaded portion, said leadscrew nut connected to said movable carriage such that said threaded portion engages said leadscrew threads between said first and second guide surfaces to propel said movable carriage axially along said leadscrew when said motor rotates said leadscrew;

wherein said leadscrew further comprises a pin extending substantially perpendicular from said leadscrew; and said head carriage further comprises a protrusion extending above said carriage such that said pin contacts said protrusion to prevent further rotation of said leadscrew when said head carriage is moved to its uppermost position along said leadscrew.

* * * * *